A. S. CRAVEN.
EXPANDING DRILL.
APPLICATION FILED NOV. 12, 1914.
1,170,221. Patented Feb. 1, 1916.
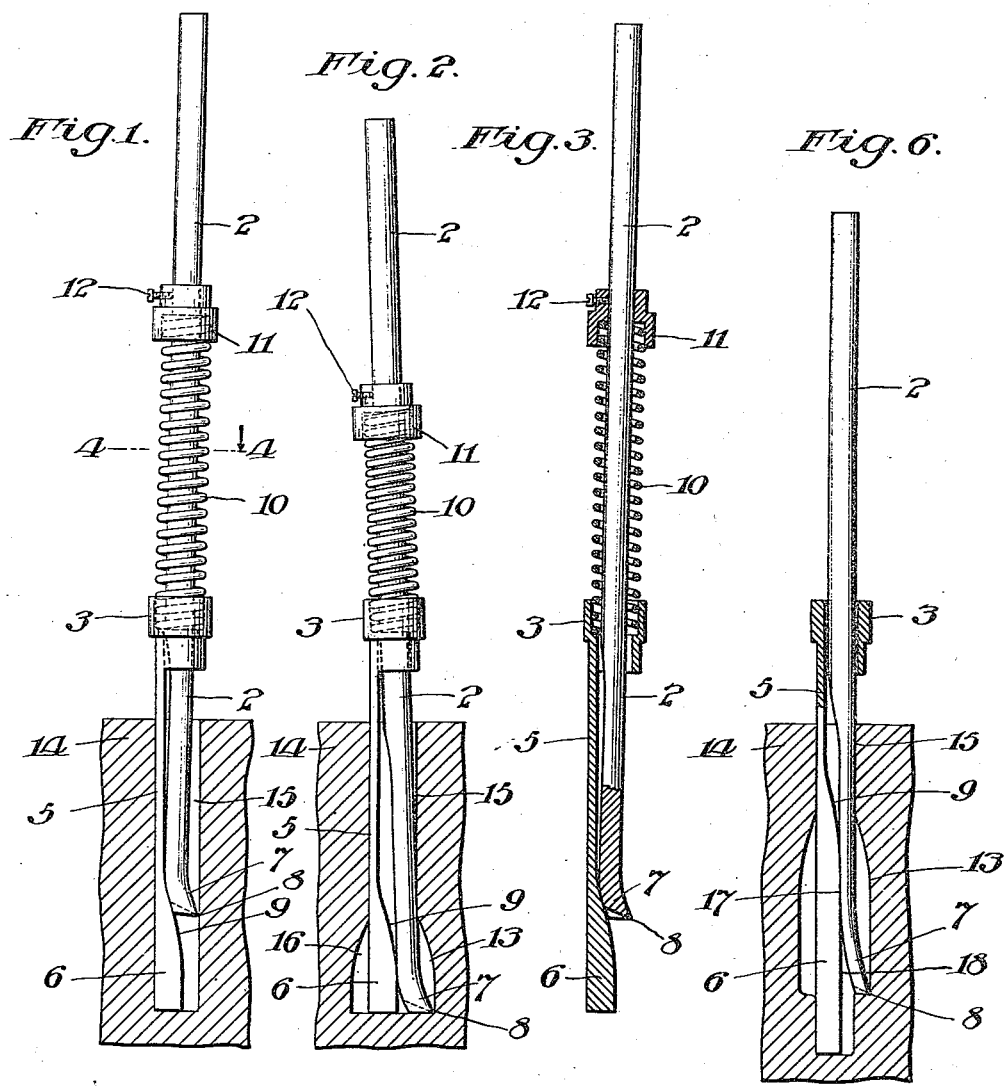
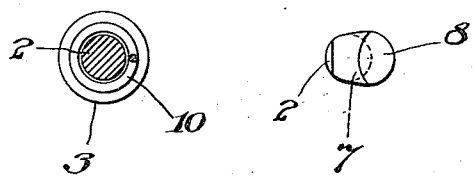
WITNESSES:
R. Schleicher
G. P. Sharkey
INVENTOR:
Aaron Sanford Craven,
BY
ATTORNEY

UNITED STATES PATENT OFFICE.

AARON SANFORD CRAVEN, OF PHILADELPHIA, PENNSYLVANIA.

EXPANDING DRILL.

1,170,221.  Specification of Letters Patent.  Patented Feb. 1, 1916.

Application filed November 12, 1914. Serial No. 871,648.

*To all whom it may concern:*

Be it known that I, AARON SANFORD CRAVEN, a citizen of the United States, residing at Philadelphia, in the county of Philadelphia and State of Pennsylvania, have invented certain new and useful Improvements in Expanding Drills, of which the following is a specification.

The object of my invention is to provide an expanding drill of novel, simple and efficient construction, having provison, first, whereby the cutter may be made rigid on the bar which carries and actuates it, secondly, whereby the cutter may be actuated to effect a long cut extending longitudinally of the drill without moving the part of the drill which guides the cutter, and, thirdly, whereby various novel advantages are attained.

The invention consists of the novel construction of the elements and the combinations thereof hereinafter fully described and particularly claimed.

In the accompanying drawings, illustrating my invention: Figure 1 is a side view of my improved drill within a hole drilled in a block of concrete or other substance which is shown in section, the cutter and its actuating bar being shown in the raised or elevated position. Fig. 2 is a view similar to Fig. 1, showing the cutter and its actuating bar in the depressed position. Fig. 3 is a vertical section through the tool. Fig. 4 is a cross section, on line 4—4 of Fig. 1. Fig. 5 is a bottom view of the cutter bar and the cutter thereon. Fig. 6 is a view showing a modification of the drill.

Referring to the drawings, I shall first describe the construction illustrated in Figs. 1 to 4, inclusive. 2 designates a vertically-disposed, cutter-carrying bar and 3 a collar loosely surrounding the bar 2. Formed integral with the collar 3 and extending downwardly from one side thereof is a leg 5 having a cam block 6 formed on or rigidly secured to the lower end thereof and located beneath the bar 2. At the lower end of the bar 2 is a cutter 7 which has a bottom cutting edge 8 and is rigid on the bar 2 and preferably formed integral therewith. The cutter 7 extends laterally from the bar 2 and it is preferably formed by bending the lower end portion of the bar laterally and forming the cutting edge 8 thereon. The lower end of the bar 2 or the part thereof forming the body of the cutter 7 is adapted to work on the cam face 9 of the block 6, during the operation of the drill, hereinafter described. The cutter bar 2 is maintained normally elevated, in the position shown in Fig. 1, by a spring 10 which encircles the bar 2 between the collar 3 and a collar 11 secured to the bar 2 above the collar 3 by a set screw 12, the upper end of the spring 10 being secured to the collar 11 by being brazed thereto, and the lower end of the spring 10 being secured to the collar 3 by being brazed thereto. The opening in the collar 3 through which the bar 2 extends is large enough to permit free lateral motion of the upper end of the bar and to permit the lower portion of the bar to move freely toward and from the leg 5 to permit the bar 2 and cutter 7 to follow the cam face 9 when the bar 2 is depressed from the position shown in Fig. 1, to the position shown in Fig. 2.

The drill shown in Figs. 1 to 4, inclusive, is adapted to drill the under-cut hole 13 in the block 14, shown in Figs. 1 and 2, and the operation is as follows: A hole is first drilled in the block 14 of the same diameter throughout its length as the upper portion 15 of the hole illustrated, and by any suitable means. My improved drill is then inserted into the hole with the bottom of the cam block 6 resting on the bottom of the hole and the parts of the drill in the normal position shown in Fig. 1. The top of the cutter bar 2 is then struck a number of blows with a hammer or other suitable tool. Each time a blow is struck, the bar 2 and its cutter 7 are forced downwardly against the action of the spring 10, and, at the same time the cam face 9 forces the cutting edge 8 into the wall forming adjacent sides of the previously drilled opening into which the drill is inserted; and each time a blow is struck, the cutter 7 moves farther down until the under-cut portion 13 of the hole in the block 14 is formed. The spring 10 returns the cutter 7 to the position shown in Fig. 1, after each blow upon the bar 2, during the cutting operation. After the under-cut portion 13 has been formed, the drill may be turned, say a half revolution, and a similar under-cut portion 16 formed in the other side of the hole. Thus an under-cut hole may be formed into which an expansion bolt may be inserted and afterward expanded.

In the modification shown in Fig. 6, the spring 10 and collar 12 are omitted, the cam block 6 is lengthened, the lower portion of the cam face 9 is terminated in the vertical face 18 and the opening in the collar 3 through which the bar 2 extends is made large enough to permit the cutter bar 2 to remain in a vertical position while the vertical face 17 thereof works against the vertical face 18 of the cam block 6. I am thus enabled to produce an under-cut portion 19 of any desired length.

I claim:

1. An expanding drill comprising a bar, a collar surrounding said bar, a leg extending downwardly from said collar, and a cam on the lower portion of said leg and having a downwardly and outwardly extending face adapted to be acted upon by the lower portion of said bar, the lower end of said bar having an outwardly extending part provided with a cutting edge and an upper face extending upwardly from said edge and inwardly therefrom toward the axis of the bar, whereby said part may enter an undercut cavity formed by said cutting edge when said part is actuated against said cam.

2. An expanding drill comprising a bar, a collar secured to said bar, a collar slidable on said bar below the first named collar, a spring encircling said bar between said collars, and a leg extending downwardly from the slidable collar, a cam on the lower portion of said leg and having a downwardly and outwardly extending face adapted to be acted upon by the lower portion of said bar, the lower end of said bar having an outwardly extending part provided with a cutting edge and an upper face extending upwardly from said edge and inwardly therefrom toward the axis of the bar, whereby said part may enter an undercut cavity formed by said cutting edge when said part is actuated against said cam.

3. An expanding drill comprising a bar, a collar secured to said bar, a collar slidable on said bar below the first named collar, a spring encircling said bar between said collars and having its upper end secured to the first named collar and its lower end secured to the second named collar; a leg extending downwardly from the slidable collar, a cam on the lower portion of said leg and adapted to be acted upon by the lower portion of said bar, and a cutter carried by the lower portion of said bar.

4. An expanding drill comprising a bar, a collar secured to said bar, a collar slidable on said bar below the first named collar, a spring encircling said bar between said collars and having its upper end secured to the first named collar and its lower end secured to the second named collar, a leg extending downwardly from one side of the slidable collar, the lower portion of said bar being free to move laterally toward and from said leg, a cam on the lower portion of said leg and adapted to be acted upon by the lower portion of said bar, and a cutter rigid on the lower portion of said bar and extending laterally therefrom.

In testimony whereof I affix my signature in presence of two witnesses.

AARON SANFORD CRAVEN.

Witnesses:
A. V. GROUPE,
R. H. SCHLEICHER.